(No Model.)
A. KREUSLER.
PROCESS OF TREATING BEER.
No. 485,012. Patented Oct. 25, 1892.
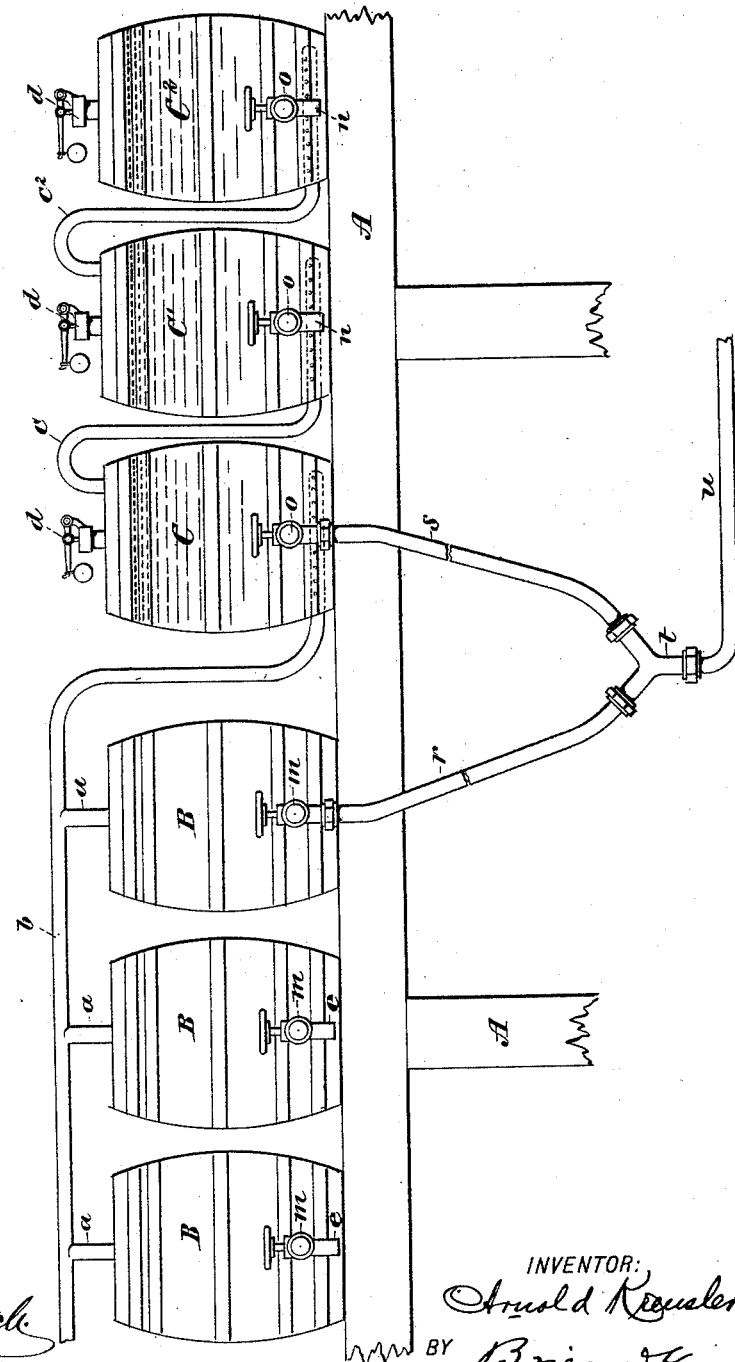
WITNESSES:
Gustave Dieterich
L. M. Wachschlager
INVENTOR:
Arnold Kreusler,
BY Briesen & Knauth
his ATTORNEYS.

UNITED STATES PATENT OFFICE.

ARNOLD KREUSLER, OF KREISCHERVILLE, ASSIGNOR TO HIMSELF, AND AUGUST ZINSSER, OF NEW YORK, N. Y.

PROCESS OF TREATING BEER.

SPECIFICATION forming part of Letters Patent No. 485,012, dated October 25, 1892.

Application filed March 21, 1892. Serial No. 425,664. (No model.)

*To all whom it may concern:*

Be it known that I, ARNOLD KREUSLER, a resident of Kreischerville, Staten Island, Richmond county, New York, have invented an Improved Process of Treating Beer and other Fermented Liquors, of which the following is a specification.

In the accompanying drawing is represented a side view of apparatus which may be used for carrying my invention into effect.

This invention has for its object to economize in the matter of labor, material, and space in the preparation of fermented beverages—such as beer and the like—in breweries or analogous structures.

Heretofore all beer produced in breweries has to be charged with an excess of carbonic-acid gas, and during its treatment and before being filled into the final kegs from the racking-vessels such beer evolves and discharges a considerable quantity of carbonic-acid gas, which gas when it escapes constitutes a loss in itself, and, in addition thereto, a loss of aromatic oils is occasioned during the several manipulations through which the liquid passes.

My invention seeks to produce a superior beverage without requiring all of it to go through the kraeusen stage, and without the waste of carbonic-acid gas and of the flavors which accompany the same.

My invention consists of the various steps of treating beer or the like and of mixing it with other matters, that will be hereinafter more fully described.

Referring to the drawing, the letter A represents a suitable frame or structure on which are supported a series of casks B B, that receive the beer from the brewery in the ordinary manner. For the purpose of my invention the beer in the vessels B B may be the ordinary liquid known by that name; but I prefer that it should be a beer of a richer and heavier quality, for sundry reasons hereinafter specified, than is the beverage of commerce. (When I mention in this specification "beer," I mean to include all analogous liquors.) Each of the vessels B B may connect by pipes $a$ with a tube $b$ for the purpose of discharging through said pipes and tube the excess of carbonic-acid gas which ordinarily is generated in such vessels during the kraeusen stage. Heretofore, and as already stated, this carbonic-acid gas was allowed to escape into the air and was lost, and with it was likewise lost the aromatic substances which it carried along. According to my present invention, however, this carbonic-acid gas is saved, and not wasted, either by being carried by the tube $b$ into the lower part of a cask C, containing a liquid, and from this cask again by a tube $c$ into the lower part of another cask C', containing liquid, and from this again through the tube $c^2$ into the lower part of another cask $C^2$ and so on to and through as many of such casks as may be desired, each containing liquid. The gas passing through the liquid in these casks C C' $C^2$, &c., aerates the same and gives off to the liquid, in addition, the larger proportion of whatever aromatic oils is carried away from the vessels B.

The liquids placed into the casks C C' $C^2$, &c., may be water, "ruhe-beer," or beer not kraeusened, and therefore not saturated or fully impregnated with carbonic-acid gas, and may be mixed with suitable flavoring substances, such as oil of hops, or hops with soluble dextrine, glucose, gum-arabic, albuminous or other substances which it may be desired to have enter into the final beverage for the purpose of enriching the flavor thereof.

The intention is to finally mix the contents of the casks C C', &c., with those of the casks B B, so as thereby to obtain a beverage which shall contain in proper proportion the ingredients in each kind of liquors.

Instead of leading the gas from the casks B over into the casks C, I may, just prior to the mixture, merely leave an excess of gas in the casks B.

To produce the final mixture, I connect one of the casks B, through its faucet $m$, with a discharge-pipe $r$, and likewise connect one of the casks C C' $C^2$, &c., at its faucet $o$ with a discharge-pipe $s$ and connect the two pipes $r$ $s$ into a final main discharge-pipe $u$, as shown in the drawing. As a consequence, the contents of the two connected casks B and C will become mixed within the pipe $u$ under pressure, access of atmospheric air being excluded, and will in this mixed condition reach the final receiving cask or vessel, together with the desired proportion of carbonic-acid gas.

The proportions of mixture from the two casks B C can be regulated by the size of the discharge-tubes connected therewith or by more or less opening valves therein, so that the final mixture will contain the precise quantity desired of fermented liquor from the casks B, fermented or other liquor from the cask C, and gas.

For the purpose of regulating the pressure of carbonic-acid gas in the casks B when the pipe $b$ is used suitable weighted gas-escape valves $d$ may be erected on the casks C, as shown.

It will be perceived from the foregoing description of my invention that I am enabled to save a great deal of space in breweries and the like by producing for the casks B whenever desired a more-concentrated fermented liquid than will finally go to the consumer. It will likewise be noticed that by my invention I am put in the condition of supplying the consumer with a beverage which shall have a less quantity of alcohol than the fermented product of the brewery in the cask B contains. It will also be observed that by my invention I economize the carbonic-acid gas, which otherwise would escape from the casks B, and that I likewise save the flavors which it is liable to carry along, and also that in the act of drawing from the casks B into the receiving kegs or keg I prevent the waste of carbonic-acid gas, which is ordinarily occasioned when beer is racked off into kegs.

I desire further to remark that in the ordinary process of brewing the best flavor of hops is largely lost, because, although the rosin extract from the hops is preserved, the aromatic oil of the plant is extremely volatile and liable to escape. By my invention this aromatic oil is carried by the carbonic-acid gas into the liquid in the casks C C' or directly from casks B into the mixing-tube $u$. Any further aroma may be added to the casks C.

Having now described my invention, what I claim is—

1. The process herein described of treating fermented liquors, which consists in conducting the gas escaping from the kraeusen casks into and through liquid in other casks, thereby aerating the same, and in then uniting the contents of both sets of casks in the desired proportions simultaneously and in the presence of the gas, substantially as specified.

2. The process herein described of making beverages, which consists in fermenting one portion, aerating another portion of such beverage, flavoring the aerated portion, and then uniting the fermented and the aerated and flavored portions before the mixture of the two reaches the final receiving-vessel, substantially as herein shown and described.

3. The process herein described of producing a fermented beverage of two liquids, which process consists in first fermenting at least one of said liquids, in then continuously mixing both said liquids while flowing with each other and with carbonic-acid gas and under pressure of said gas, substantially as described.

ARNOLD KREUSLER.

Witnesses:
HARRY M. TURK,
L. M. WACHSCHLAGER.